UNITED STATES PATENT OFFICE.

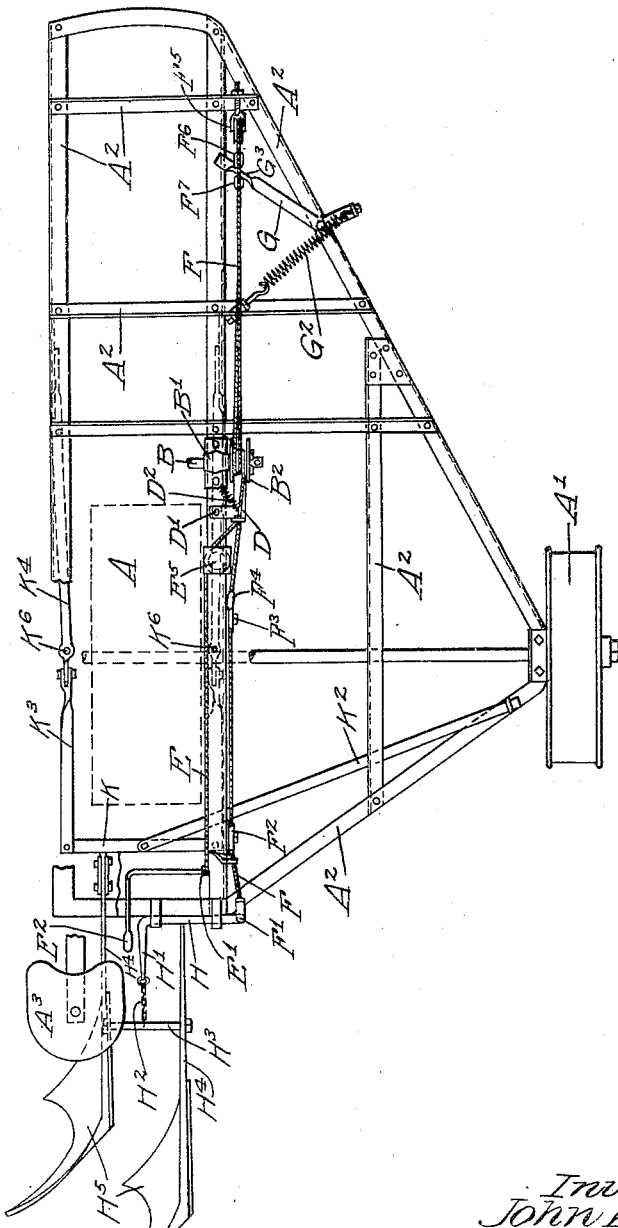

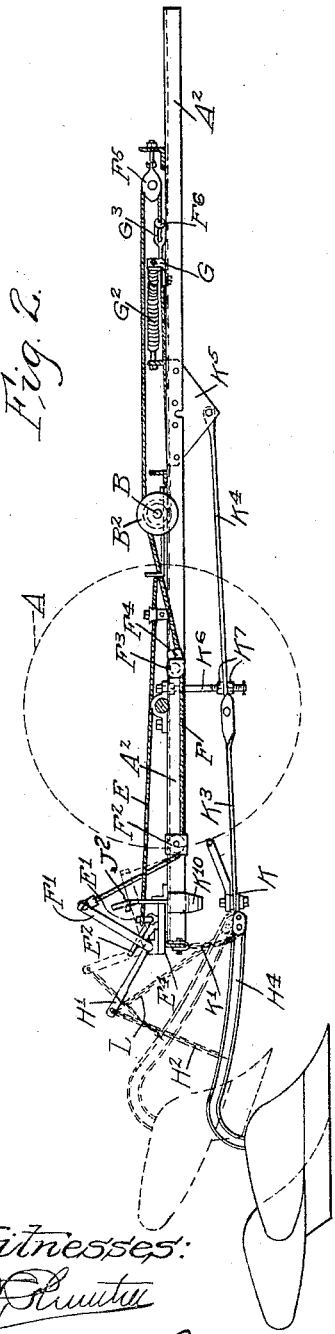
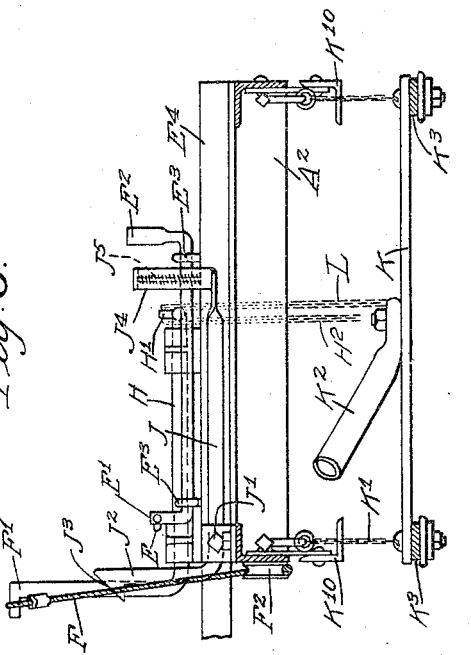
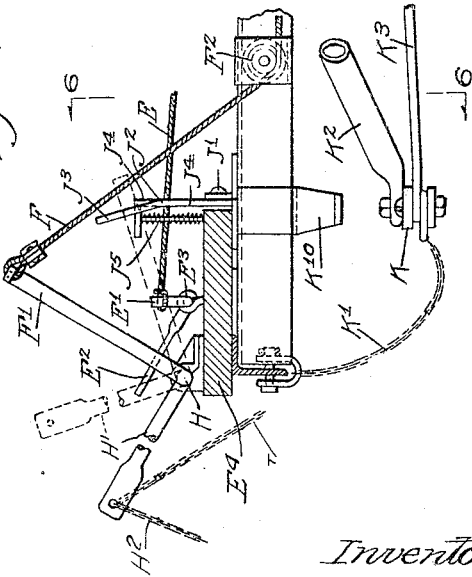

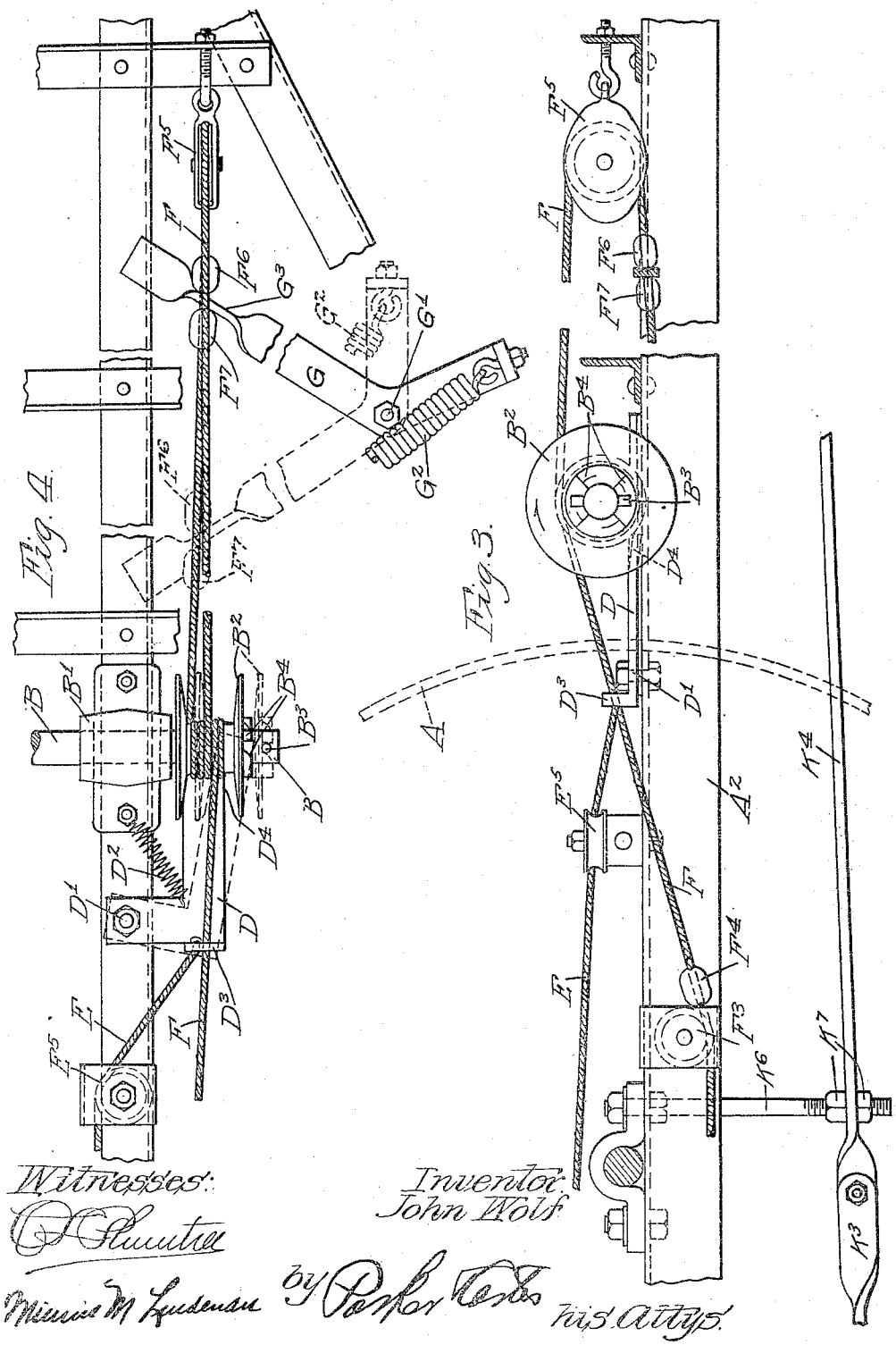

JOHN WOLF, OF LAPORTE, INDIANA, ASSIGNOR, BY MESNE ASSIGNMENTS, TO ADVANCE-RUMELY COMPANY, OF LAPORTE, INDIANA, A CORPORATION OF INDIANA.

TRACTION-PLOW.

1,202,947.      Specification of Letters Patent.      Patented Oct. 31, 1916.

Application filed October 14, 1914. Serial No. 866,568.

*To all whom it may concern:*

Be it known that I, JOHN WOLF, a citizen of the United States, residing at Laporte, in the county of Laporte and State of Indiana, have invented a certain new and useful Improvement in Traction-Plows, of which the following is a specification.

My invention relates to traction plows, and has for its object among other things to provide means for automatically raising and lowering the plows, for preventing the plows from falling so as to bend or injure their points and also to provide means for causing the plows to retain a uniform depth of furrow.

My invention is illustrated in the accompanying drawings in the present form of application.

Figure 1 is a plan view with parts removed; Fig. 2 a similar side elevation; Fig. 3 an enlarged detail side elevation of the forward part of the tract or frame. Fig. 4 a detail plan view of the forward part of the frame. Fig. 5 a detail elevation in part section of the rear part of the frame, and Fig. 6 a cross section on the line 6—6 of Fig. 5.

Like parts are indicated by the same letter in all the figures.

A is the driving wheel, and $A^1$ a supporting wheel, and $A^2$ the several parts of the frame, which is preferably shaped substantially as shown. The engine for driving the traction wheel and any other supporting or guiding wheels which may be required or desired are not here shown.

$A^3$ is the operator's seat.

B is a continuously rotating shaft driven in any desired manner mounted on the bearing $B^1$ and provided with a sliding spool $B^2$ on its projecting end. It also has a pin $B^3$ between which and the bearing the spool is free to move longitudinally along the shaft. On the outer end of the spool are a series of teeth $B^4$, whereby when the spool is moved outwardly by engagement with the pin $B^3$ the spool may be locked to the shaft so as to rotate therewith. Under other conditions the spool acts as an idler on the shaft.

D is a bell crank lever pivoted on the frame at $D^1$ and held in the full line position of Fig. 4, by the spiral spring $D^2$. It has a rear upward projection $D^3$, and its forward end $D^4$ lies between the two flanges of the spool $B^2$ so that when the bell crank lever is rocked on its pivot it tends to move the spool back and forth upon its shaft.

E is a rope secured to one arm $E^1$ of a lever, the other arm of which, $E^2$, is adjacent the driver's seat. The lever is pivoted at $E^3$ on the rear platform $E^4$. The rope E passes forward around the pulley $E^5$, and is made fast to the projection $D^3$ on the lever D. By operating the lever arm $E^2$, the lever D may be rocked on the pivot to move the spool back and forth on the shaft.

F is a rope which is made fast at one end to the arm $F^1$. It passes under the pulley $F^2$ mounted on the frame and forwardly under the second pulley $F^3$ in like manner mounted on the frame, and is provided with a stop-block $F^4$ which normally lies against the frame of the pulley $F^3$. The rope passes through an aperture in the projection $D^3$, and thence is carried over and around the spool, thence this rope passes forward around the pulley in the pivot block $F^5$ whence it returns and passes on to the spool from below and is made fast thereto. It carries the stop-blocks $F^6$, $F^7$. Obviously when the spool is rotated in the direction indicated by the arrow in Fig. 3, the rope F will travel in such direction as to move the stop-blocks $F^6$, and $F^7$ toward the left as illustrated in Figs. 3 and 4. This action will continue until the stop-block $F^4$ engages the projection $D^3$ on the lever D, whereupon the latter will be swung into the position in full lines on Fig. 4, and the spool will be out of operative engagement with the shaft B, and will cease to rotate.

G is a lever pivoted at $G^1$ on the frame.

$G^2$ is a spiral spring attached at one end to the frame, and at the other to one arm of the lever.

$G^3$ is a portion of the other arm of the lever which is perforated to permit the passage of the rope F. The blocks $F^6$ and $F^7$ lie on opposite sides of this arm of the lever. With this arrangement, the lever will be carried into the position shown in dotted lines in Fig. 4. The arm $F^1$ is attached to the rock shaft H, at the other end of which is the arm $H^1$ with a chain $H^2$ leading to the cross bar $H^3$, to which the plow beams $H^4$ carrying the plows $H^5$ are attached. Obviously, therefore, when the spool is in operation to wind up the rope, the plows are lifted first against the action of the spring $G^2$, and the moment it has passed the pivotal point $G^1$ then with the aid of that spring. At the limit of this motion the spool will be cut out of operation and the spring $G^2$ would then be insufficient to hold the plows in their elevated position. I therefore provide a lock lever therefor. Such a lever diagrammatically shown in Fig. 6 may consist of the following parts:—A body J pivoted at $J^1$ with the upwardly projecting end $J^2$ having the beveled hook $J^3$ and the upwardly projecting end $J^4$ associated with the spring $J^5$ which tends to keep that end of the lever in its upright position or in the normal position shown in Fig. 6. The hook end $J^3$ is in the path of the arm $F^1$ and serves to clamp the same to keep the shaft H from rotating and allowing the plows to drop back into the earth. By pressing downward on the end $J^4$ of the lever J, it may be rocked on its pivot to disengage the hook from the arm $F^1$ whereupon the plows will drop diagonally into the earth but against the action of the spring $G^2$ so that they will drop down gently until the spring $G^2$ has passed the pivot $G^1$, or into the position illustrated in full lines in Fig. 4, at which time there will be no further hindrance to the dropping of the plows, and they will pass into the ground in the proper position. Any other device for supporting the plows in their elevated position could be employed.

The plow beams $H^4$ are secured at their forward ends to the floating cross beam K, the two ends of which are loosely supported by the chains $K^1$, $K^1$, which pass upwardly to the frame. To the middle of the cross beam is secured a diagonal brace $K^2$, its other end being attached to the frame near the supporting wheel $A^1$. The cross beam to which the plow beams are attached is secured at its two ends to links $K^3$, $K^3$, which are in turn pivotally connected to the draw-bars $K^4$, $K^4$, which are pivoted to the downwardly depending plates $K^5$ on the frame. The rear end of the draw-bars $K^4$ are held in adjustable position by means of the downwardly depending bolts $K^6$, and the lock nuts $K^7$ on the bolt on opposite sides of each draw-bar. This gives an adjustable but rigid support to the plow beams and their forwardly extending links at a point approximately below the axle of the drive wheel.

I have described these several parts and illustrated them somewhat in detail, because they are taken from a working drawing, but I do not wish to be understood as limiting myself to the particular size, shape, form and arrangement of these several parts, or even to the use of all of them in any given structure, and in this sense I expect my drawings to be taken as diagrammatic and illustrative of the general principles of my invention.

The chain L may be used when desired to connect the outer end of the lever arm $H^1$ with the forward end of the plow beam. Such chain should be of suitable length not to interfere with the action of the plow but limit or act as a stop to the desired motion of the forward end of the beam when the plow is being raised.

The use and operation of my invention as described are as follows:—Assuming that the frame is properly mounted on suitable wheels and provided with proper driving power, the tractor under the guidance of the operator will move forward in the usual manner. If now the plows are to be dropped into the ground, the operator will free the hook $J^2$ from the arm $F^1$, whereupon the plows, by reason of their weight, will begin to descend, expanding as they descend the spring $G^2$ so as to reduce the speed of descent and cushion the plows against a sudden striking of their points against the earth. The spring $G^2$, however, ceases to act the moment it passes $G^1$, and the plows are thereafter gently dropped into the earth in proper position. The stop-block $F^4$ will be against the pulley frame $F^3$. The depth of the furrow is determined by setting the nuts $K^7$ on the bolt $K^6$. When the plows are to be raised, the operator depresses the lever $F^2$, thus drawing upon the rope E, and throwing the lever D into the position shown in dotted lines in Fig. 4. This operatively engages the spool with the shaft and causes the rope F to be wound up and the plows to be lifted out of the earth. Assuming now that the plows are in operation, since the effective point of their attachment by the beams to the frame is directly below the axis of the tractor wheel, no motion up and down of the forward end of the frame due to irregularities in the surface of the earth, can alter the position of the plows, so as to vary the depth of the furrow, for the frame, however much it may be moved up or down at the forward end, rotates about the axis of the drive wheel, and this is in effect rotation about the forward ends of the plow beams so there is no tendency to raise or lower the beams at that point. The chains $K^1$, $K^1$, are sufficiently slack to permit a movement of the rear end of the frame up or down without displacing the plow beams. Should the tractor wheel encounter surface irregularities, the forward end of the beam being substantially under the axis of rotation of the traction wheel, will respond to such irregularities of the ground rising or falling therewith and thus changing the position of the plow sufficiently to enable it to maintain a uniform furrow for the plow point when it reaches the spot at which the irregularity was encountered by the wheel, will be found to have raised or lowered sufficiently to keep a practical uniform furrow, and here again slackening the chain K¹ is sufficient to permit such action. The brace K prevents the lateral vibration of the cross beam to which the plow beams are secured, and it has sufficient freedom of movement at both ends to permit this, notwithstanding the relative upward and downward motion of such cross beams. The draw-bar in this case consists of the beam of the plow and the link which passes forwardly therefrom, and the extension of the draw-bar is that part which proceeds from the forward part of the frame to the forward end of the draw-bar at or near the point where the latter is vertically adjustable.

I claim:

1. In a traction plow the combination of a frame, wheels on which it is supported, plows pivotally attached thereto, a shaft continuously rotated, a spool loose on the shaft, means to attach the spool to the shaft, a pulley on the frame, a rope attached to the plow back of its pivot and passed about the spool and the pulley and attached to the spool, a lever pivoted on the frame and attached at one end to the rope, a spring attached to the other end of the lever and adapted to successively lie on opposite sides of the pivotal point as the lever shifts its position.

2. In a traction plow the combination of a frame, wheels on which it is supported, plows pivotally attached thereto, a shaft continuously rotated, a spool loose on the shaft, means to attach the spool to the shaft under the control of the operator, a pulley on the frame, a rope attached to the plow back of its pivot and passed about the spool and the pulley and attached to the spool, a lever pivoted on the frame and attached at one end to the rope, a spring attached to the other end of the lever and adapted to successively lie on opposite sides of the pivotal point as the lever shifts its position.

3. In a traction plow the combination of a frame, wheels on which it is supported, plows pivotally attached thereto, a shaft continuously rotated, a spool loose on the shaft, means to attach the spool to the shaft under the control of the operator, means to disengage the spool from the shaft responsive to the upward movement of the plows, a pulley on the frame, a rope attached to the plow back of its pivot and passed about the spool and the pulley and attached to the spool, a lever pivoted on the frame and attached at one end to the rope, a spring attached to the other end of the lever and adapted to successively lie on opposite sides of the pivotal point as the lever shifts its position.

4. In a traction plow the combination of a frame, wheels on which it is supported, plows pivotally attached thereto, a shaft continuously rotated, a spool loose on the shaft, means to attach the spool to the shaft, a rope attached to the plow back of its pivot and passed about the spool, a lever pivoted on the frame and attached at one end to the rope, a spring attached to the other end of the lever and adapted to successively lie on opposite sides of the pivotal point as the lever shifts its position.

5. In a traction plow the combination of a frame, wheels on which it is supported, plows pivotally attached thereto, a shaft continuously rotated, a spool loose on the shaft, means to attach the spool to the shaft under the control of the operator, a rope attached to the plow back of its pivot and passed about the spool, a lever pivoted on the frame and attached at one end to the rope, a spring attached to the other end of the lever and adapted to successively lie on opposite sides of the pivotal point as the lever shifts its position.

6. In a traction plow the combination of a frame, wheels on which it is supported, plows pivotally attached thereto, a shaft continuously rotated, a spool loose on the shaft, means to attach the spool to the shaft under the control of the operator, means to disengage the spool from the shaft responsive to the upward movement of the plows, a rope attached to the plow back of its pivot and passed about the spool, a lever pivoted on the frame and attached at one end to the rope, a spring attached to the other end of the lever and adapted to successively lie on opposite sides of the pivotal point as the lever shifts its position.

In testimony whereof, I affix my signature in the presence of two witnesses this 12th day of October, 1914.

JOHN WOLF.

Witnesses:
 BESSIE S. RICE,
 MINNIE M. LINDENAU.

Copies of this patent may be obtained for five cents each, by addressing the "Commissioner of Patents, Washington, D. C."